UNITED STATES PATENT OFFICE.

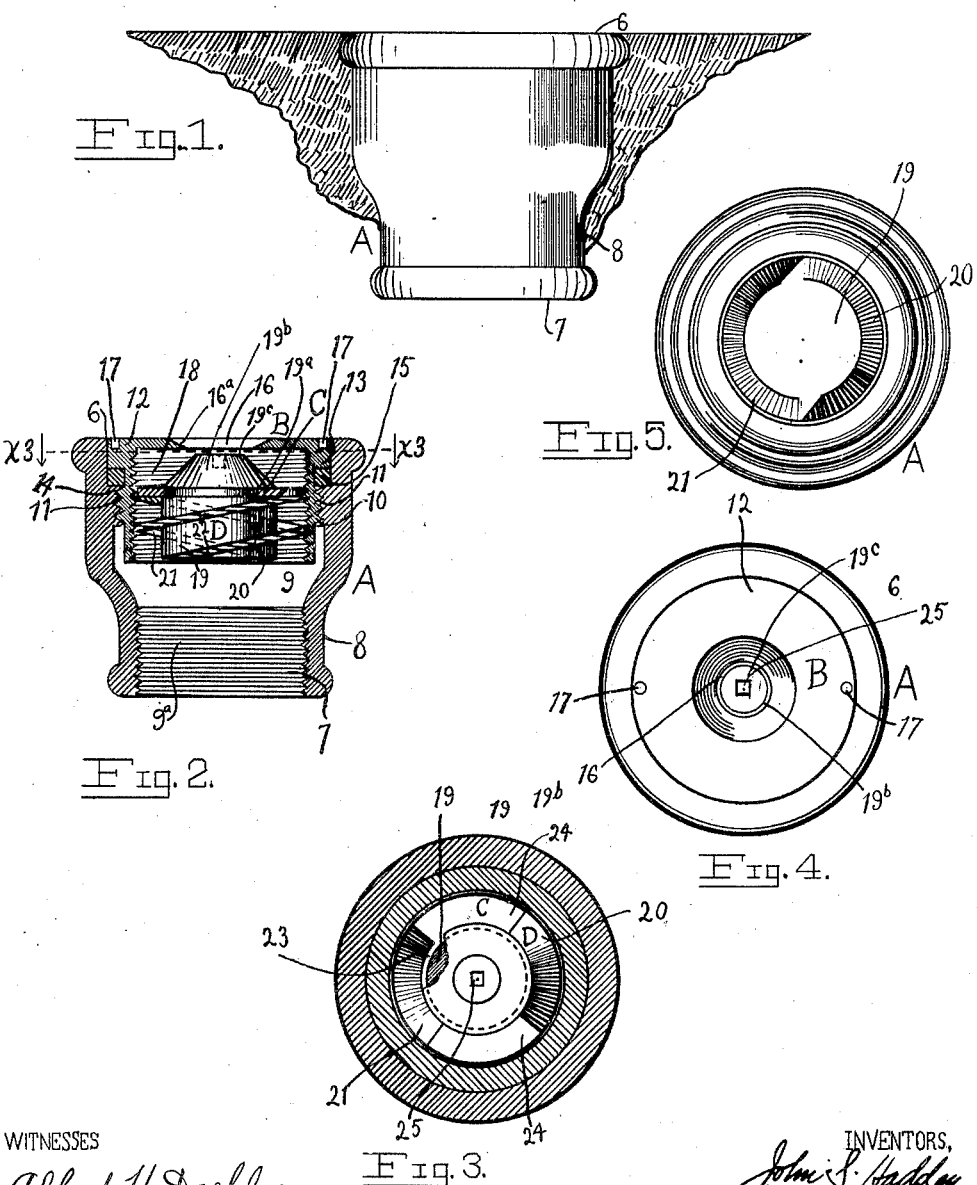

JOHN S. HADDEN, OF HUNTINGTON PARK, AND FREDERICK H. JOHNSON, OF SOUTH PASADENA, CALIFORNIA.

SPRINKLER.

1,078,433.  Specification of Letters Patent.  Patented Nov. 11, 1913.

Application filed August 22, 1912. Serial No. 716,525.

*To all whom it may concern:*

Be it known that we, JOHN S. HADDEN, a subject of the King of Great Britain, and FREDERICK H. JOHNSON, a citizen of the United States, residing, respectively, at Huntington Park, in the county of Los Angeles and State of California, and at South Pasadena, in the county of Los Angeles and State of California, have jointly invented new and useful Improvements in Sprinklers, of which the following is a specification.

This invention relates to sprinklers, and more particularly to sprinklers for lawns and the plant life of gardens and the like; and it has for its object to provide a sprinkling device of this general character which will effectively distribute the water supplied thereto over a relatively wide area with a satisfactory degree of uniformity; and which sprinkler device will be generally superior in point of relative simplicity and inexpensiveness of construction, convenience and facility in attachment and detachment and adjustment and assemblage and disconnection of its several parts and features, compactness in form, durability, reliability and positiveness and effectiveness in use and operation, and which will furthermore be generally superior in efficiency and serviceability in the various classes of service for which it is adapted.

With the above and other objects in view, the invention consists in the novel and useful provision, formation, combination, association and relative arrangement of parts, members and features, all as hereinafter described, shown in the drawing, and finally pointed out in claims.

In the drawing:—Figure 1 is a side elevation of a lawn sprinkler constructed and organized in accordance with the invention; Fig. 2 is a vertical transverse sectional view of the same, parts being in elevation; Fig. 3 is a horizontal transverse sectional view of the same, taken upon the line $x^3$—$x^3$, Fig. 2, and looking in the direction of the appended arrows. Fig. 4 is a top plan view of the sprinkler shown in the other figures; and, Fig. 5 is a bottom plan view of the same.

Corresponding parts in all the figures are designated by the same reference characters.

Referring with particularity to the drawing, in which the invention is shown specifically as embodied in a lawn sprinkling device or lawn sprinkler, A designates a shell, casing or housing within which the several working parts of the sprinkler are contained, and which is annular in form and provided with an upper circular orifice 6 and a lower circular orifice 7. The shell A is preferably contracted throughout a portion of its extension above the lower orifice 7 as at 8, within which contracted portion screw threads $9^a$ are formed for uniting the shell with a similarly threaded union or nipple connected with or upon a water supply main or pipe (not shown). Within the shell A are housed three relatively adjustable members B, C and D, the first of which consists of a tubular body 9 having between its bottom and top portions screw threads 10 which co-engage with screw threads 11 formed interiorly of the shell A. The tubular body 9 has an enlarged upper end portion or head 12, producing an annular shoulder 13 between which and an annular shoulder 14 produced in the inner wall of the shell A above the threads 11 is received a washer 15 producing a water-tight joint between the body 9 and the shell A. The head 12 closes the upper end of the tubular body 9 with the exception of the central portion thereof in which is produced an outlet or discharge opening 16 of countersunk formation, whereby the walls $16^a$ thereof flare outwardly and upwardly in predetermined angularity. Suitable diametrically opposed recesses 17 are produced in the head or top 12 of the body 9 for the reception of a suitable implement for connecting and disconnecting the body 9 and the shell A at the screw threads 10 and 11.

The body 9 is provided with interior screw threads 18, and the member D is adjustably connected with said screw threads 18, such member comprising a cylindrical core or body 19 upon which are produced or disposed helical walls or flanges 20 and 21 each of which extends for somewhat less than one complete turn around the core or body 19, the lower ends or termini of said flanges or walls being approximately diametrically opposed and the upper ends or termini of said flanges or walls being approximately diametrically opposed, both flanges or walls being of the same pitch, screw-fashion, in their production or development around the core or body 19. Two helical passages are thus produced, each of which is confined above and beneath by parts of both of the flanges or walls 20 and 21, throughout approximately 120° of a complete turn around the core 19. Each such passage at its lower end leads into an inlet zone confined at the top by a portion of a separate one of the flanges or walls 20 and 21; and each of such passages opens at its upper end into an outlet zone confined at the bottom by a portion of the other one of the flanges or walls 20 and 21. The said inlet zones are approximately diametrically opposed, and the said outlet zones are approximately diametrically opposed. The said flanges or walls 20 and 21 are threaded at their peripheries, as at 22, to take into the screw threads 18 within the tubular body 9. The inner wall of the tubular body 9 thus closes the passages between the flanges or walls 20 and 21.

The core or body 19 is surfaced off plane at the bottom and into the same merge the lower termini of the flanges or walls 20 and 21; and the upper end of the core or body 19 extends in reduced cylindrical formation slightly above the upper termini of the flanges or walls 20 and 21 as at $19^a$; and such core or body 19 is finished off above such portion $19^a$ in a truncated conical head $19^b$ the upper face $19^c$ of which is plane and of a circular formation slightly smaller than that of the outlet or discharge opening 16 in the top of the head 12 with which it registers.

The member C is mounted upon the member D, and comprises an annulus 23 which surrounds the core or body 19 immediately beneath the truncated conical upper end $19^b$ thereof, being rotatively mounted within and confined by the walls of the reduced portion $19^a$. This member C further comprises diametrically oppositely projecting shutter vanes 24 each of which is segmental in formation and extends substantially through 90° of the same circle, whereby they may both be positioned to entirely close the outlet zones of the two channels between the flanges 20 and 21 or may be so positioned as to entirely open such outlet zones.

In the top face $19^c$ of the core or body 19 is produced a recess or socket 25 for the reception of a suitable implement to enable the member D to be adjusted within the member B, by means of the screw threads 22 and 18.

The operation, method of use and advantages in service of the improved sprinkler organized to embody the invention will be readily understood from the foregoing description taken in connection with the accompanying drawing and the following statement:—With the parts in the relative positions shown in the drawing, water rising through the lower orifice 7 of the shell A, from the service pipe, will enter the channels between and confined in part by the helical flanges or walls 20 and 21, and in part confined by the inner wall of the tubular body 9, and will ascend, entering through the inlet zones at the lower ends of such channels, and emerging from the outlet zones at the upper ends of said channels, the shutter vanes 24 being disposed so as not to obstruct said outlet zones. In its upward passage through such channels, which are of helical formation, the water receives a torque or twist or tendency to whirl, and this tendency is preserved as the water rises at the sides of and flows over the truncated conical top $19^b$ of the core or body 19 and finds its way out through the discharge opening 16 in the head 12 of the tubular body 6. The out-rush of the water is tangential to the whirl within the opening 16, and spreads laterally in a relatively flat fan-like formation, the degree of flattening of such jet being dependent upon the relative separation of the truncated conical top $19^b$ of the member D and the head 12 of the tubular body 9. The member D is adjustable to a material degree within the body 9, by means of the co-engaging threads 22 and 18; and the more remotely such member D be adjusted from the head 12, the higher the jet or column of water will rise in its laterally arching discharge from the opening 16. If the member D is brought into close proximity to the discharge opening 16, the jet or column of water discharged will be substantially in the form of a flat sheet extending outwardly from the sprinkler, or having the sprinkler as a center, and covering a wide area of lawn or other formation. The adjustment of the member D with respect to the discharge opening is conveniently performed by introducing a suitable implement through the discharge opening and into the recess 25 in the top $19^b$ of the member D. The amount of water which is passed upwardly to the discharge opening through the channels around the member D may be varied by adjusting the member C, so as to close to a greater or lesser extent the outlet zones or upper ends of such channels by means of the shutter vanes 24.

The device is manifestly capable of such adjustment and control as to produce the particular formation of emitted water column or jet so as to conform the same to the particular lawn area or other surfaces which it is desired to sprinkle or spray; and the entire device is of few and simple parts, not liable to get out of order or to deteriorate in long use.

The head 12 may be installed flush with the surface of the earth or lawn, as indicated fragmentarily in Fig. 1, so that the sprinkler presents no projecting portion for obstruction or interference.

It is manifest that by bringing the member D at its truncated conical top $19^b$ up closely into engagement with the head 12, such truncated conical top will entirely close the discharge opening 16 and shut off the flow of water through the sprinkler.

We do not desire to be understood as limiting ourselves to the particular provision, formation, construction, combination, association and relative arrangement of parts, members and features shown and described; but reserve the right to vary the same, in adapting the improvements to varying conditions of use, without departing from the spirit of the invention or the terms of the following claims.

Having thus described our invention, we claim and desire to secure by Letters Patent:—

1. A device of the character described, comprising a casing provided with a discharge opening, a member within the casing adjustable toward and away from the discharge opening, said member having spaced peripheral flanges threaded to the casing, and a peripheral helical passage being provided in the adjustable member between the flanges, through which passage water may be passed to said discharge opening.

2. A device of the character described, comprising a casing provided with a discharge opening, a member within the casing adjustable toward and away from the discharge opening, said member having spaced peripheral flanges threaded to the casing, and a helical passage being provided in the adjustable member between the flanges, through which passage water may be passed to said discharge opening; and means for varying the amount of water traversing said passage.

3. A device of the character described, comprising a casing, a tubular body threaded into the casing and provided with a head having a discharge opening, and a member threaded within the tubular body and adjustable toward and away from the discharge opening and comprising a cylindrical body provided with projecting helical spaced walls producing helical passages through which water may be passed to said discharge opening said passages having spaced outlet openings; in combination with a shutter rotatable upon said cylindrical body and having vanes adapted to partly or wholly close or entirely clear said outlet openings.

4. A device of the character described, comprising a casing, a tubular body threaded into the casing and provided with a head having a discharge opening, and a member threaded within the tubular body and adjustable toward and away from the discharge opening and comprising a cylindrical body provided with projecting helical spaced walls producing helical passages through which water may be passed to said discharge opening said passages having spaced outlet openings; in combination with a shutter rotatable upon said cylindrical body and having vanes adapted to partly or wholly close or entirely clear said outlet openings, said cylindrical body terminating in a truncated conical portion presented to said discharge opening.

In testimony whereof, we have signed our names to this specification in the presence of two subscribing witnesses.

JOHN S. HADDEN.
FREDERICK H. JOHNSON.

Witnesses:
C. P. WARDEN,
ALFRED H. DAEHLER.